(12) United States Patent
Ashrafi

(10) Patent No.: US 11,841,346 B2
(45) Date of Patent: *Dec. 12, 2023

(54) APPARATUS AND METHOD FOR ACOUSTIC MODELING OF DEFECTS IN COMPOSITE MATERIALS USING CALIBRATION PANELS FORMED BY ADDITIVE MANUFACTURING

(71) Applicant: The Boeing Company, Chicago, IL (US)

(72) Inventor: Mahdi Ashrafi, Ladson, SC (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,119

(22) Filed: Feb. 8, 2022

(65) Prior Publication Data

US 2022/0163489 A1    May 26, 2022

Related U.S. Application Data

(62) Division of application No. 16/654,946, filed on Oct. 16, 2019, now Pat. No. 11,275,058.

(51) Int. Cl.
*G01N 29/30* (2006.01)
*G01N 29/04* (2006.01)
(52) U.S. Cl.
CPC ............. *G01N 29/30* (2013.01); *G01N 29/04* (2013.01)
(58) Field of Classification Search
CPC .... B33Y 80/00; G01N 29/04; G01N 29/4472; G01N 29/30; B29C 64/112
(Continued)

(56) References Cited

U.S. PATENT DOCUMENTS 7,222,514 B2    5/2007    Kollgaard et al.
7,320,241 B2    1/2008    Kollgaard et al.
(Continued)

FOREIGN PATENT DOCUMENTS

EP    3118618    1/2017
EP    3617700    3/2020

OTHER PUBLICATIONS

Office Action for EP Patent Application No. 20192246.5 dated Dec. 7, 2022.
(Continued)

*Primary Examiner* — Jacques M Saint Surin
(74) *Attorney, Agent, or Firm* — Kunzler Bean & Adamson

(57) ABSTRACT

Disclosed herein is a calibration panel that models acoustic properties of defects in vehicle components made of composite materials. The calibration panel includes a body formed by additive manufacturing from a first digital material having an acoustic property selected to approximate an acoustic property of a composite material and an insert embedded within the body. The insert is formed of at least a second digital material having an acoustic property selected to approximate an acoustic property of a defect within the composite material. Also disclosed is a method for manufacturing vehicle components that are non-destructive evaluation (NDE)-compliant. The method includes receiving a proposed design of a component, manufacturing the calibration panel, and testing the calibration panel to determine if the insert is detectable using acoustic emission testing. The method also includes rejecting, in response to a not-detectable status of the insert, the proposed design of the component.

20 Claims, 5 Drawing Sheets

(58) Field of Classification Search
USPC .......................................................... 73/1.86
See application file for complete search history.

(56) References Cited

U.S. PATENT DOCUMENTS

| | | | | |
|---|---|---|---|---|
| 8,509,933 | B2 * | 8/2013 | Steingart | B33Y 50/00 |
| | | | | 700/98 |
| 9,140,673 | B2 | 9/2015 | Ferguson et al. | |
| 9,600,929 | B1 * | 3/2017 | Young | G06T 17/00 |
| 10,345,272 | B2 | 7/2019 | Holmes et al. | |
| 10,871,471 | B1 * | 12/2020 | Sanders | B33Y 30/00 |
| 11,275,058 | B2 * | 3/2022 | Ashrafi | B33Y 80/00 |
| 2007/0101815 | A1 | 5/2007 | Kollgaard et al. | |
| 2008/0196475 | A1 | 8/2008 | Engelbart et al. | |
| 2009/0303064 | A1 | 12/2009 | LaBreck et al. | |
| 2011/0029114 | A1 | 2/2011 | Rose et al. | |
| 2013/0047697 | A1 | 2/2013 | Zhang | |
| 2014/0311416 | A1 | 10/2014 | Stiles et al. | |
| 2015/0100149 | A1 | 4/2015 | Coeck et al. | |
| 2016/0009029 | A1 | 1/2016 | Cohen et al. | |
| 2020/0072797 | A1 | 3/2020 | Rautureau et al. | |

OTHER PUBLICATIONS

Martin B.G., Ultrasonic wave propagation in fiberreinforced solids containing voids, Journal of Applied Physics, Aug. 8, 1977, pp. 3368-3373, vol. 48, American Institute of Physics.
Extended European Search Report for EP Patent Application No. 20192246.5 dated Feb. 19, 2021.

* cited by examiner

APPARATUS AND METHOD FOR ACOUSTIC MODELING OF DEFECTS IN COMPOSITE MATERIALS USING CALIBRATION PANELS FORMED BY ADDITIVE MANUFACTURING

FIELD

This disclosure relates generally to non-destructive testing of composite materials and, more particularly, to the fabrication of calibration panels for acoustic non-destructive testing of composite materials.

BACKGROUND

Vehicles, including air-borne vehicles, increasingly are being made with components formed from composite materials. For examples, large portions of aircraft, such as wings, empennages, stabilizers, and fuselages, may be constructed of fiber-reinforced polymer laminates. Many other smaller components of aircraft are also being formed of composite laminates. To ensure safety, these components must pass rigorous testing procedures. Non-destructive testing techniques, such as ultrasonic quantitative analysis techniques, provide information on manufacturing quality, material strength, and useful lifetime of the components. However, such non-destructive techniques may require a reference or calibration structure, which is often hand-made and requires a significant amount of time to fabricate, to ensure proper testing of manufactured parts.

SUMMARY

The subject matter of the present application provides example calibration panels that overcome the above-discussed shortcomings of prior art techniques. The subject matter of the present application has been developed in response to the present state of the art, and in particular, in response to shortcomings of current methods of component design, testing, and fabrication.

Disclosed herein is a calibration panel that includes a body, formed by additive manufacturing from a first digital material having an acoustic property selected to approximate an acoustic property of a composite material. The calibration panel also includes an insert embedded within the body, the insert formed of at least a second digital material having an acoustic property selected to approximate an acoustic property of a defect within the composite material. The preceding subject matter of this paragraph characterizes example 1 of the subject disclosure.

The calibration panel, in certain examples, includes a front surface and an opposing back surface. The insert, in certain examples, is embedded within the body at a distance from the front surface selected to approximate a depth of the defect within the composite material. The preceding subject matter of this paragraph characterizes example 2 of the subject disclosure, wherein example 2 also includes the subject matter according to example 1, above.

The defect is selected from the group consisting of a void, porosity, a non-uniform material distribution, a delamination, a contaminant, an inclusion, and damage. The preceding subject matter of this paragraph characterizes example 3 of the subject disclosure, wherein example 3 also includes the subject matter according to any one of examples 1 or 2, above.

The second digital material, in certain embodiments, is selected based on a determined acoustic impedance value $Z'_d$ according to the equation $$R_1 = R_2 \Rightarrow \left(\frac{Z_d - Z_b}{Z_d + Z_b}\right)^2 = \left(\frac{Z'_d - Z'_b}{Z'_d + Z'_b}\right)^2$$

where $Z_d$ is an impedance of an actual defect, $Z_b$ is an impedance of the composite material, $Z'_d$ is an impedance of the defect, and $Z'_b$ is an impedance of the body. The preceding subject matter of this paragraph characterizes example 4 of the subject disclosure, wherein example 4 also includes the subject matter according to any one of examples 1-3, above.

The insert, in certain examples, is formed of the second digital material and at least a third digital material. The preceding subject matter of this paragraph characterizes example 5 of the subject disclosure, wherein example 5 also includes the subject matter of any one of examples 1-4, above.

The insert is formed with a thickness based on a difference between the of sound through the defect and a velocity of sound through the composition. The preceding subject matter of this paragraph characterizes example 6 of the subject disclosure, wherein example 6 also includes the subject matter of example 5 above.

In certain examples, volume fraction $f$ of the second digital material is based on a desired velocity of sound $C_d$, an elastic moduli $E_1$ of the second digital material, an elastic moduli $E_2$ of the third digital material, a density $\rho_1$ of the second digital material, a density $\rho_2$ of the third digital material, a Poisson ratio $v_1$ of the second digital material, and a Poisson ration $v_2$ of the third digital material, and where the volume fraction $f$ is determined according to an equation:

$$C_d = \sqrt{\frac{fE_1 + (1-f)E_2}{f\rho_1 + (1-f)\rho_2}\left[\frac{1 - fv_1 - (1-f)v_2}{(1 - 2(fv_1 + (1-f)v_2))(1 + 3(fv_1 + (1-f)v_2))}\right]}.$$

The preceding subject matter of this paragraph characterizes example 7 of the subject disclosure, wherein example 7 also includes the subject matter of example 6, above.

The desired velocity of sound $C_d$, is a velocity of sound through the defect, and where a velocity of sound through the second digital material is less than the desired velocity of sound $C_d$. The preceding subject matter of this paragraph characterizes example 8 of the subject disclosure, wherein example 8 also includes the subject matter according to example 7, above.

Additionally, disclosed herein is a method of manufacturing a calibration panel. The method includes, in certain examples, forming a body by additive manufacturing from a first digital material having an acoustic property selected to approximate an acoustic property of a composite material, and mixing a second digital material and a third digital material to form an insert where the second digital material has an acoustic property value less than an acoustic property value of a defect within the composite material, and where the third digital material has an acoustic property value greater than the acoustic property value of the defect. The method also includes embedding the insert within the body. The preceding subject matter of this paragraph characterizes example 9 of the subject disclosure.

The method also includes forming a front surface and an opposing back surface. The preceding subject matter of this paragraph characterizes example 10 of the subject disclosure, wherein example 10 also includes the subject matter according to example 9, above.

The method also includes embedding the insert within the body at a distance from the front surface selected to approximate a depth of the defect within the composite material. The preceding subject matter of this paragraph characterizes example 11 of the subject disclosure, wherein example 11 also includes the subject matter according to example 10, above.

The method also includes embedding the insert within the body at a distance from the front surface selected based on a difference between a speed of sound of the composite material and a speed of sound of the first digital material. The preceeding subject mater of this paragraph characterizes example 12 of the subject disclosure, wherein example 12 also includes the subject matter according to example 10, above.

The method also includes selecting the defect from the group consisting of a void, porosity, a non-uniform material distribution, a delamination, a contaminant, an inclusion, and damage. The preceding subject matter of this paragraph characterizes example 13 of the subject disclosure, wherein example 13 also includes the subject matter according to any one of examples 9-12, above.

The method also includes determining a volume fraction $f$ of the second digital material based on a desired velocity of sound $C_d$, an elastic moduli $E_1$ of the second digital material, an elastic moduli $E_2$ of the third digital material, a density $\rho_1$ of the second digital material, a density $\rho_2$ of the third digital material, a Poisson ratio $v_1$ of the second digital material, and a Poisson ration $v_2$ of the third digital material. The method, in certain examples, also includes determining the volume fraction $f$ according to an equation:

$$C_d = \sqrt{\frac{fE_1 + (1-f)E_2}{f\rho_1 + (1-f)\rho_2} \left[ \frac{1 - fv_1 - (1-f)v_2}{(1 - 2(fv_1 + (1-f)v_2))(1 + 3(fv_1 + (1-f)v_2))} \right]}.$$

The preceding subject matter of this paragraph characterizes example 14 of the subject disclosure, wherein example 14 also includes the subject matter according to any one of examples 9-13, above.

The desired velocity of sound $C_d$, is equivalent to a velocity of sound through the defect, and the method also includes selecting a digital material from a plurality of digital materials as the second digital material, where the second digital material has a velocity of sound through the second digital material less than the desired velocity of sound $C_d$. The preceding subject matter of this paragraph characterizes example 15 of the subject disclosure, wherein example 15 also includes the subject matter according to example 14, above.

The method also includes, selecting a digital material from a plurality of digital materials as the third digital material, where the third digital material has a velocity of sound through the third digital material greater than the desired velocity of sound $C_d$. The preceding subject matter of this paragraph characterizes example 16 of the subject disclosure, wherein example 16 also includes the subject matter according to example 15, above.

Additionally disclosed herein, is a method of manufacturing a non-destructive evaluation (NDE)-compliant component. The method, in certain examples, includes receiving design data indicative of a proposed design of a component, and manufacturing a reference standard model of the component. The reference standard model includes a body formed by additive manufacturing from a first digital material having an acoustic property selected to approximate an acoustic property of a composite material specified within the design data, and an insert embedded within the body, the insert formed of at least a second digital material having an acoustic property selected to approximate an acoustic property of a defect within the composite material. The method also includes testing the reference standard model to determine if the insert is detectable using acoustic emission testing, and rejecting, in response to a not-detectable status of the insert, the proposed design of the component. The preceding subject matter of this paragraph characterizes example 17 of the subject disclosure.

The method also includes forming the insert from a composition of the second digital material and at least a third digital material. The preceding subject matter of this paragraph characterizes example 18 of the subject disclosure, wherein example 18 also includes the subject matter according to example 17, above.

The method also includes determining a volume fraction $f$ of the second digital material based on a desired velocity of sound $C_d$, an elastic moduli $E_1$ of the second digital material, an elastic moduli $E_2$ of the third digital material, a density $\rho_1$ of the second digital material, a density $\rho_2$ of the third digital material, a Poisson ratio $v_1$ of the second digital material, and a Poisson ration $v_2$ of the third digital material. The method, in certain examples, also includes determining the volume fraction $f$ according to an equation:

$$C_d = \sqrt{\frac{fE_1 + (1-f)E_2}{f\rho_1 + (1-f)\rho_2} \left[ \frac{1 - fv_1 - (1-f)v_2}{(1 - 2(fv_1 + (1-f)v_2))(1 + 3(fv_1 + (1-f)v_2))} \right]}.$$

The preceding subject matter of this paragraph characterizes example 19 of the subject disclosure, wherein example 19 also includes the subject matter according to example 18, above.

The desired velocity of sound $C_d$, is equivalent to a velocity of sound through the defect, and the method also includes selecting a digital material from a plurality of digital materials as the second digital material, where the second digital material has a velocity of sound through the second digital material less than the desired velocity of sound $C_d$. The preceding subject matter of this paragraph characterizes example 20 of the subject disclosure, wherein example 20 also includes the subject matter according to example 19, above.

The described features, structures, advantages, and/or characteristics of the subject matter of the subject disclosure can be combined in any suitable manner in one or more examples, including embodiments and/or implementations. In the following description, numerous specific details are provided to impart a thorough understanding of examples of the subject matter of the subject disclosure. One skilled in the relevant art will recognize that the subject matter of the subject disclosure can be practiced without one or more of the specific features, details, components, materials, and/or methods of a particular example, embodiment, or implementation. In other instances, additional features and advantages can be recognized in certain examples, embodiments, and/or implementations that can not be present in all examples, embodiments, or implementations. Further, in some instances, well-known structures, materials, or operations are not shown or described in detail to avoid obscuring aspects of the subject matter of the subject disclosure. The features and advantages of the subject matter of the subject disclosure will become more fully apparent from the following description and appended claims, or can be learned by the practice of the subject matter as set forth hereinafter.

BRIEF DESCRIPTION OF THE DRAWINGS

In order that the advantages of the subject matter can be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the subject disclosure. Appearances of the phrases "in one example," "in an example," and similar language throughout this specification can, but do not necessarily, all refer to the same example. Similarly, the use of the term "implementation" means an implementation having a particular feature, structure, or characteristic described in connection with one or more examples of the subject disclosure, however, absent an express correlation to indicate otherwise, an implementation can be associated with one or more examples.

The subject disclosure describes an apparatus and a method for fabricating, by additive manufacturing in some examples, a reference panel (e.g., calibration panel) that mimics the acoustic properties of a vehicle component or part. In some examples, an insert, having acoustic properties selected to model a defect, is embedded within the calibration panel. Many vehicle components have a requirement to be "non-destructive evaluation" (NDE) capable. Determining if a newly proposed design is NDE capable requires creating a calibration panel with intentional defects and then performing NDE testing to determine if the defects are detected. The systems and methods disclosed herein provide the ability to achieve quantifiable and/or repeatable acoustic properties, which is valuable in NDE reference standard fabrication. Additive manufacturing (e.g., 3D printing) of the calibration panel greatly speeds up iterations of the design cycle of the proposed component design. As will be described below in greater detail, the materials used to create the calibration panel are selected to mimic the acoustic properties of the proposed component design. In particular, mimicking (or modeling) the acoustic properties of a defect in a composite structure is achieved by mixing two or more materials in some examples.

Figure 1:
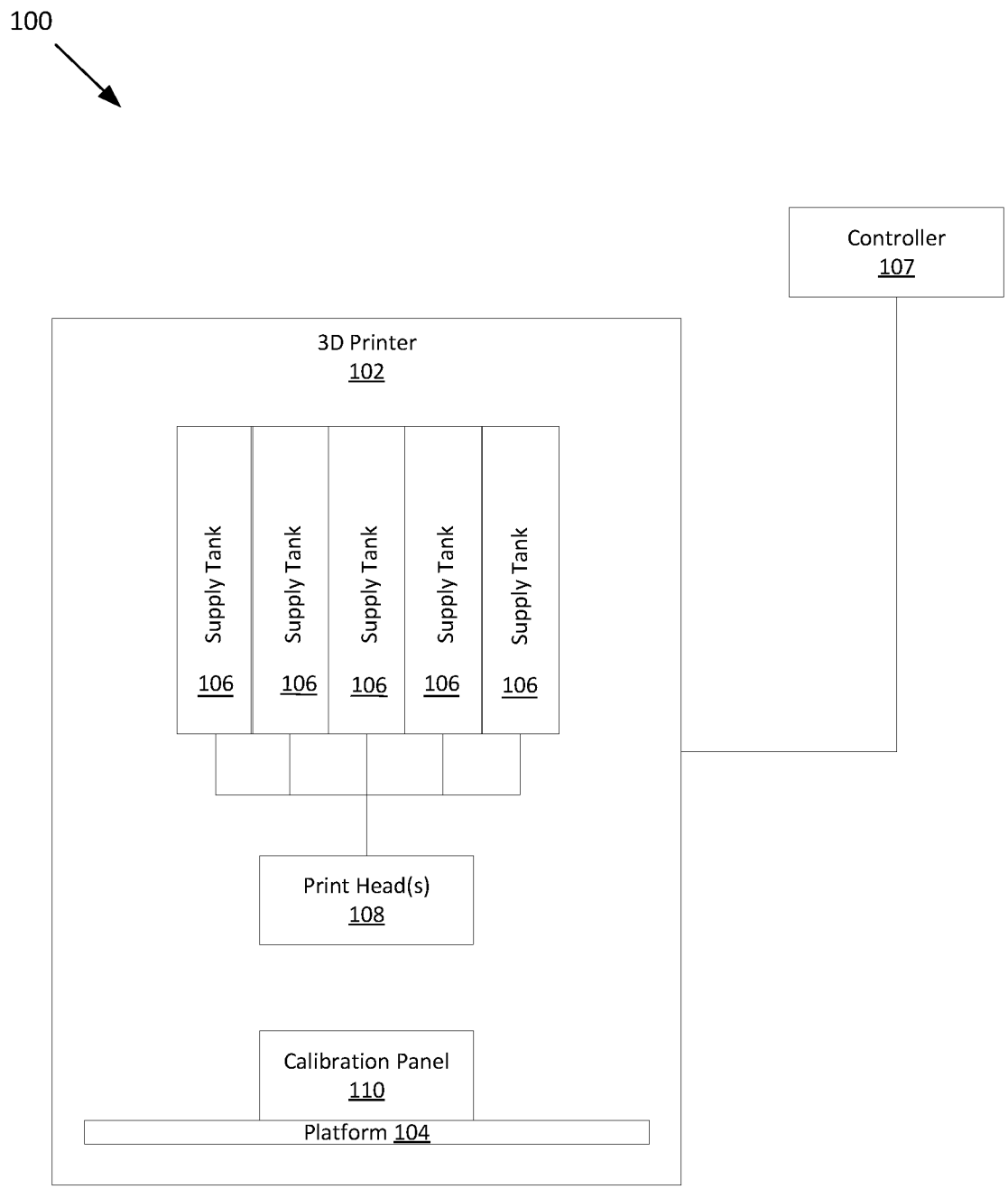
FIG. 1 is a schematic block diagram illustrating a system that includes an additive manufacturing or three-dimensional (3D) printer, in accordance with examples of the subject disclosure.

FIG. 1 is a schematic block diagram illustrating a system 100 that includes an additive manufacturing or three-dimensional (3D) printer 102, according to examples of the subject disclosure. The 3D printer 102 is configured for building three dimensional objects by selectively depositing chemical compositions (e.g., polymer compositions) onto a platform 104. The chemical compositions are made of one or more different materials, each supplied by a corresponding one of one or more supply tanks 106 of the 3D printer 102. The one or more materials that form the chemical compositions are combined and presented to one or more print heads 108 of the 3D printer 102. A controller 107 receives a design plan and directs the 3D printer 102 to fabricate a calibration panel 110 by depositing chemical compositions on the platform 104 layer-by-layer using the print head(s) 108. Each chemical composition is deposited as dispensed droplets from the print head 108. The layers are cured or solidified using a suitable mechanism (not shown), including a heater or a ultraviolet (UV) radiator, for instance. In another example, the curing or solidification of each deposited droplet of chemical composition is activated by contact with an adjacent droplet.

In some examples, each voxel of the calibration panel 110 is printed with a different chemical composition. A "voxel" refers to a value in the design plan that represents an element of volume in three-dimensional space. Similar to pixels in a two-dimensional space, a voxel is an individually addressable volume element that has definable physical properties. A multitude of voxels define the configuration of the calibration panel 110. The controller 107 directs the 3D printer 102 to form a different chemical composition for each voxel of one or more "digital materials" in some examples. The volume fraction $f$ of the digital materials in the chemical composition of each voxel is selected according to a desired acoustic property, as will be discussed below in greater detail with reference to FIG. 2. As used herein, the phrase "digital material" refers to a modeling material on a voxel-level scale that is useful in 3D printing to form the calibration panel 110. In certain examples, a digital material is also a material composed of one or more base materials with variable (but controlled) mixture ratios. The base materials are made from chemically compatible and stable resins that can be mixed and matched together. In various examples, photomolymers with rubber-like properties are mixed with photopolymers resembling ABS properties.

Many of the components of the 3D printer 102 are omitted for clarity, such as heaters, radiation sources, leveling devices, gas supply devices, etc. The one or more print heads 108 receive one or more digital materials from the supply tanks 106. Each supply tank 106 is a reservoir or hopper for feeding the print heads 108. The 3D printer also includes a curing system suitable for the type of material being deposited. In some examples, the curing system uses ultraviolet, visible, or infrared light to cure the material. Other examples of curing systems include microwave radiation sources, ultrasound radiation sources, etc.

The print head 108, in certain examples, is moveable with reference to the platform 104. Alternatively, the print head 108 and the platform 104 are moveable with reference to a frame (not show) that houses the 3D printer 102. Typically, the platform 104 is configured to move upward and downward towards and away from the print head 108 (a Z axis) while the print head 108 is configured to move in an XY plane (Y axis defined as into and out of the page, and X axis defined as to the left and the right). In some examples, a heater is provided within the 3D printer 102 enclosure to maintain an elevated temperature that ensures that the compositions are in a liquid form allowing them to be dispensed by the print head 108.

In certain examples, the digital materials used to form the calibration panel 110 are selected to mimic an acoustic property of a proposed vehicle component. For example, if the proposed vehicle component is formed of a carbon-fiber composite, the calibration panel 110 is formed of a "base" digital material that mimics the acoustic properties of the carbon fiber. According to some examples, inserts (see FIG. 3) formed of a second digital material are embedded within the calibration panel to mimic defects that potentially exist or are prone to exist within the proposed vehicle component. Testing of the calibration panel 110 for compatibility with NDE ultrasonic testing equipment allows the component designer to determine if the proposed component design is going to satisfy NDE-capable requirements.

The controller 107, as will be described in greater detail below, controls the print head 108 and the mixing of the digital materials from the supply tanks 106. The controller, in certain examples, translates the design plan into instructions that are executable by the 3D printer 102. For example, the design plan can be a Standard Tessellation Language (STL) format. Further, the controller 107 is configured to modify the STL format of the design plan to include voxel-level material composition information, as is described below with reference to FIG. 2.

Figure 2:
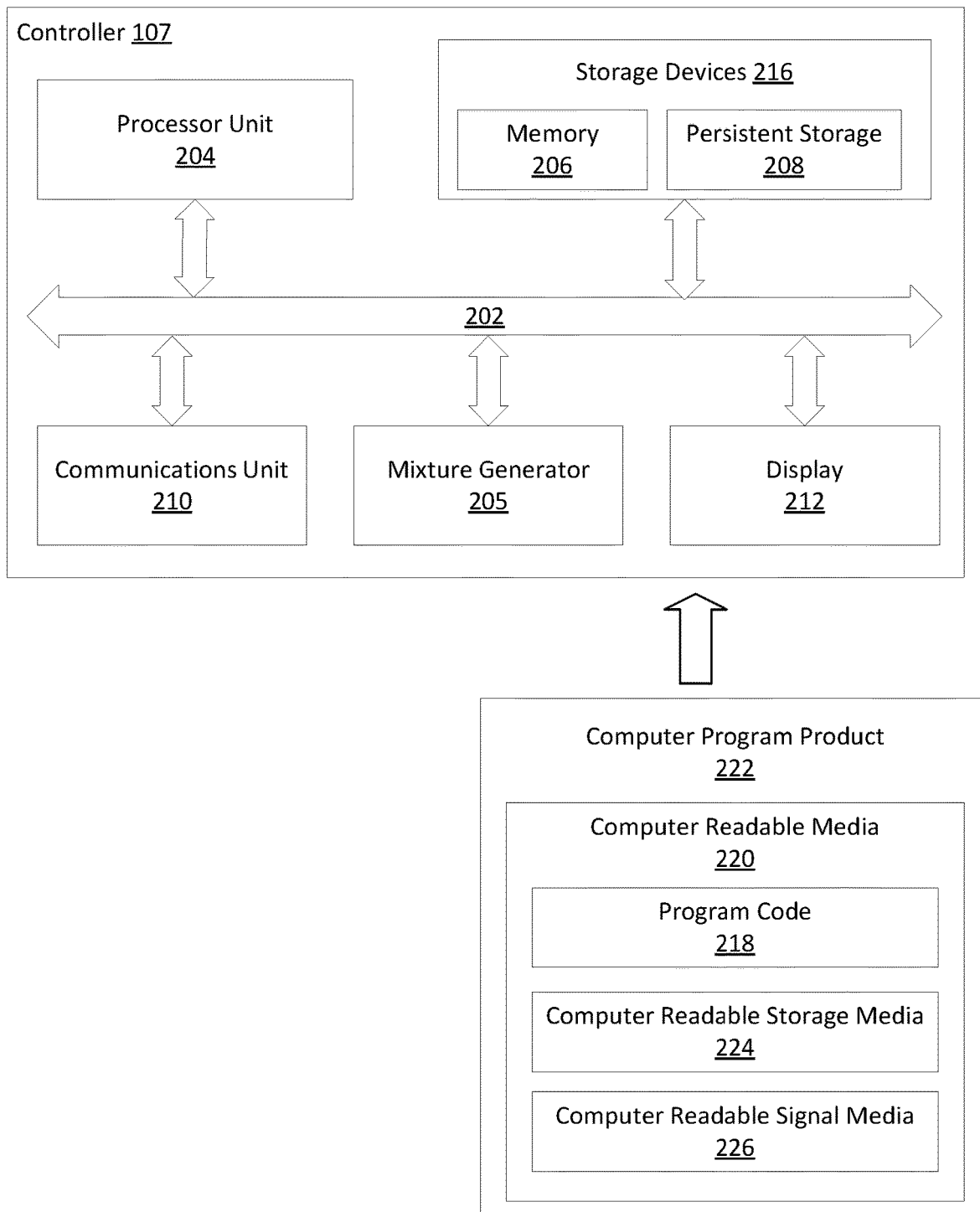
FIG. 2 is a schematic block diagram illustrating a controller of the system of FIG. 1, according to examples of the subject disclosure.

FIG. 2 is a schematic block diagram illustrating a controller 107, according to examples of the subject disclosure. The controller 107 is an example of a computing device, which, in some examples, is used to implement one or more components of examples of the disclosure, and in which computer usable program code or instructions implementing the processes can be located for the illustrative examples. In this illustrative example, the controller includes a communications fabric 202, which provides communications between a processor unit 204, a mixture generator 205, memory 206, persistent storage 208, a communications unit 210, and a display 212.

The processor unit 204 serves to execute instructions for software that are loaded into memory 206 in some examples. In one example, the processor unit 204 is a set of one or more processors or can be a multi-processor core, depending on the particular implementation. Further, the processor unit 204 is implemented using one or more heterogeneous processor systems, in which a main processor is present with secondary processors on a single chip, according to some examples. As another illustrative example, the processor unit 204 is a symmetric multi-processor system containing multiple processors of the same type.

The mixture generator 205 is configured to determine a composition of different digital materials that will match or approximate an acoustic property of a base composite material, and the acoustic properties of different defects within the base composite material. In certain examples, the acoustic property is the speed of sound through the material. Other acoustic properties include, but are not limited to, reflection, frequency, noise, attenuation, and/or impedance. Mixing various materials together in different volume fractions results in different speeds of sound. Accordingly, the mixture generator 205 can beneficially create a composition that mimics the acoustic properties of both the base (or bulk) composite material and a different composition that mimics the acoustic properties of a defect within the composite material. This allows for the rapid fabrication of a calibration panel that serves as a stand-in for a proposed component design to determine if the proposed component design will be NDE compliant or not. The ability to achieve quantifiable and repeatable acoustic properties is valuable in NDE reference standard fabrication. The defects, such as air gaps, overlays, and foreign objects, can be modeled by embedding an insert (see FIG. 3) within a body of the calibration panel 110.

The mixture generator 205, in certain examples, maintains a database of acoustic properties (e.g., speeds of sounds through specific materials, reflectivity, etc.), and in particular, those digital materials in the supply tanks 106. The mixture generator 205 receives from the design plan desired position, quantity, and type of defects to model in the calibration panel 110 and modifies the design plan with composition information that mimics or models the defects. In certain examples, the mixture generator 205 receives the design plan via the communications unit 210. The design plan is stored in storage devices 216. For example, the mixture generator 205 is configured to determine a volume fraction of a first digital material and a volume fraction of a second digital material that will result in a desired acoustic property. The desired acoustic property (e.g., speed of sound) corresponds to a desired defect type. In certain examples, the design plan is received via the communications unit 210 and/or is stored in the storage devices 216.

In one example, the composition of a mixture selected to mimic a desired acoustic property is determined, by the mixture generator 205, according to the formula:

$$C_d = \sqrt{\frac{fE_1 + (1-f)E_2}{f\rho_1 + (1-f)\rho_2}\left[\frac{1 - fv_1 - (1-f)v_2}{(1 - 2(fv_1 + (1-f)v_2))(1 + 3(fv_1 + (1-f)v_2))}\right]},$$

where a volume fraction $f$ of a first digital material is based on a desired velocity of sound $C_d$, an elastic moduli $E_1$ of the first digital material, an elastic moduli $E_2$ of a second digital material, a density $\rho_1$ of the first digital material, a density $\rho_2$ of the second digital material, a Poisson ratio $v_1$ of the first digital material, and a Poisson ration $v_2$ of the second digital material. Sound waves propagate due to the vibrations or oscillatory motions of particles within a material, and therefore are a function of the elastic module E.

In selecting the first and second digital materials, the mixture generator 205, in certain examples, selects a digital material with an acoustic velocity less than the desired velocity of sound $C_d$ (i.e., the acoustic velocity of a desired defect), and another digital material with an acoustic velocity greater than $C_d$. The mixture generator 205 then determines the appropriate volume fractions of the two digital materials to achieve $C_d$. As discussed above, this determination is be made according to the formula, or alternatively, according to a lookup table maintained by the mixture generator 205 (e.g., stored in storage devices 216).

In certain examples, the mixture generator 205 also considers frequency of an acoustical signal, as changing the frequency when the sound velocity is fixed will result in a change in the wavelength of sound. Therefore, the wavelength of an ultrasonic NDE tester has a significant effect on the probability of detecting a discontinuity. According to some examples, the mixture generator 205 also considers noise, which is the result of competing reflections in microstructure grains. A good measure of defect detectability is the signal-to-noise ratio, which is a measure of how the signal from the defect compares to other background reflections (categorized as "noise"). One example of a suitable signal-to-noise ratio according to examples of the subject disclosure is 3 to 1.

In certain embodiments, the mixture generator 205 considers reflectivity. When an ultrasonic signal reflects, and the rest of the signal transmits through the body 110, this reflectivity is used to identify defects within the body 110 in some examples. Correspondingly, inserts embedded in to a calibration panel mimic the acoustic property of reflectivity in some examples. Reflectivity R is generally determined by the equation:

$$R = \left(\frac{Z_d - Z_b}{Z_d + Z_b}\right)^2$$

where $Z_d$ is the ultrasonic impedance of a defect, and $Z_b$ is the ultrasonic impedance of the body. The impedance of the defect or the body is related to the density of either the defect or the body and the acoustic velocity of either the defect or the body. The mixture generator 205 is configured to mimic reflection of a defect in proposed component design with an insert in the body by adjusting the acoustic impedance of the insert (see FIG. 3). Where $Z_d$ is the impedance of an actual defect, $Z_b$ is the impedance of a composite material to be used in the proposed component design, $Z'_d$ is the impedance of the simulated defect, and $Z'_b$ is the impedance of the body of a calibration panel, in some examples, the mixture generator 205 selects a digital material based on a calculated Z value using the equation:

$$R_1 = R_2 \Rightarrow \left(\frac{Z_d - Z_b}{Z_d + Z_b}\right)^2 = \left(\frac{Z'_d - Z'_b}{Z'_d + Z'_b}\right)^2$$

and impedance values of known materials. Stated differently, a digital material, with a known impedance that matches the impedance determined by the equation, is selected by the mixture generator 205 to mimic the impedance of a desired defect in some examples.

In certain embodiments, the mixture generator 205 also considers attenuation, which is how the intensity of sound diminishes with distance. Additionally, in some examples, the mixture generator 205 considers impedance, which is defined as the product of the materials density and acoustic velocity. Impedance is useful in the determination of acoustic transmission and reflection at the boundary of two materials having different acoustic impedances to assess absorption of sound in a medium.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, is a random-access memory, or any other suitable volatile or non-volatile storage device. Persistent storage 208 takes various forms, depending on the particular implementation. In one example, persistent storage 208 contains one or more components or devices. In an example, persistent storage 208 is a hard drive, a flash memory, a rewritable optical disk, a rewritable magnetic tape, or some combination of the above. The media used by persistent storage 208 is removable in some examples. For example, a removable hard drive is used for persistent storage 208 in various implementations.

The communications unit 210, in these examples, provides for communication with other data processing systems or devices. In these examples, the communications unit 210 is a network interface card. The communications unit 210 provides communications through the use of either, or both, physical and wireless communications links. In some examples, the communication unit 210 also provides a connection for user input through a keyboard, a mouse, and/or some other suitable input device. Further, the input/output unit sends output to a printer or receive input from any other peripheral device in various examples. The display 212 provides a mechanism to display information to a user.

In some examples, instructions for the operating system, applications, and/or programs are located in the storage devices 216, which are in communication with the processor unit 204 through the communications fabric 202. In these illustrative examples, the instructions are in a functional form on persistent storage 208. These instructions are loaded into memory 206 for execution by the processor unit 204 in some examples. In certain examples, the processes of the different examples are performed by the processor unit 204 using computer implemented instructions, which is located in a memory, such as the memory 206.

These instructions are referred to as program code, computer usable program code, or computer readable program code that can be read and executed by a processor in the processor unit 204. The program code, in the different examples, is embodied on different physical or computer readable storage media, such as the memory 206 or the persistent storage 208.

Program code 218 is located in a functional form on computer readable media 220 that is selectively removable and can be loaded onto or transferred to the controller 107 for execution by the processor unit 204. In some examples, the program code also contains the repair plan discussed above with reference to FIG. 1. The program code 218 and computer readable media 220 form computer program product 222. In one example, the computer readable media 220 is a computer readable storage media 224 or a computer readable signal media 226. The computer readable storage media 224 includes, in one example, an optical or magnetic disc that is inserted or placed into a drive or other device that is part of the persistent storage 208 for transfer onto a storage device, such as a hard drive, that is part of the persistent storage 208. In other examples, the computer readable storage media 224 also takes the form of a persistent storage, such as a hard drive, a thumb drive, or a flash memory that is connected to the controller 107. In some instances, the computer readable storage media 224 is not be removable from the controller 107.

Alternatively, the program code 218 is transferred to the controller 107 using computer readable signal media 226. Computer readable signal media 226 is, as one example, a propagated data signal containing program code 218. For example, the computer readable signal media 226 is an electromagnetic signal, an optical signal, and/or any other suitable type of signal in one example. These signals are transmitted over communications links, such as wireless communication links, an optical fiber cable, a coaxial cable, a wire, and/or any other suitable type of communications link. In other words, the communications link and/or the connection is physical or wireless in the illustrative examples. The computer readable media also takes the form of non-tangible media, such as communications links or wireless transmissions containing the program code, in some examples.

In some illustrative examples, the program code 218 is downloaded over a network to the persistent storage 208 from another device or data processing system through the computer readable signal media 226 for use within the controller 107. In one instance, program code stored in a computer readable storage media in a server data processing system is downloaded over a network from a server to the controller 107. According to various examples, the system providing the program code 218 is a server computer, a client computer, or some other device capable of storing and transmitting program code 218.

The different components illustrated for the controller 107 are not meant to provide physical or architectural limitations to the manner in which different examples can be implemented. The different illustrative examples can be implemented in a controller including components in addition to and/or in place of those illustrated for the controller 107. Other components shown in FIG. 2 can be varied from the illustrative examples shown. The different examples can be implemented using any hardware device or system capable of executing program code. For example, a storage device in the controller 107 is any hardware apparatus that can store data. The memory 206, persistent storage 208, and the computer readable media 220 are examples of storage devices in a tangible form.

In another example, a bus system is used to implement communications fabric 202 and can be comprised of one or more buses, such as a system bus or an input/output bus. Of course, in some examples, the bus system is implemented using any suitable type of architecture that provides for a transfer of data between different components or devices attached to the bus system. In addition examples, a communications unit includes one or more devices used to transmit and receive data, such as a modem or a network adapter. Further, a memory is, for example, the memory 206 or a cache such as found in an interface and memory controller hub that can be present in the communications fabric 202.

Computer program code for carrying out operations for aspects of the subject disclosure can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
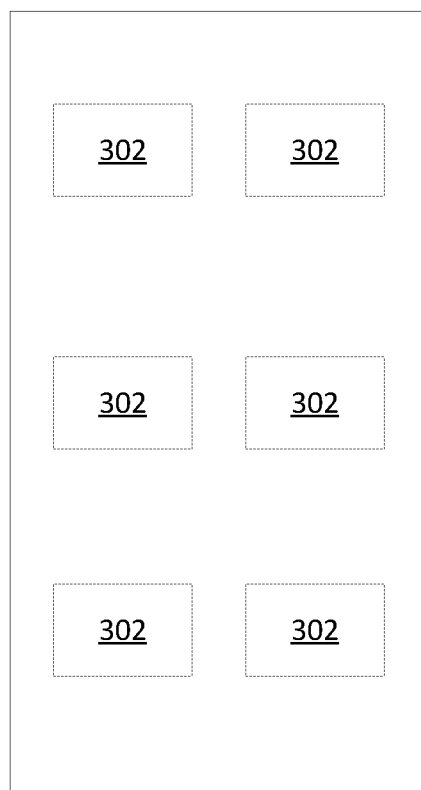
FIG. 3 is a schematic block diagram illustrating a top of a calibration panel, according to examples of the subject disclosure.

FIG. 3 is a schematic block diagram illustrating a top of the calibration panel 110, according to examples of the subject disclosure. The calibration panel 110, in certain examples, is formed as a block that is rectangular in shape. The calibration panel 110 is formed of a bulk material selected to mimic the acoustic properties of a proposed component design. The proposed component is be formed of a composite material, such as carbon fiber and resin, in some examples. The bulk material selected to mimic the acoustic properties, therefore, has acoustic properties that mimic composite carbon fiber. Embedded within the calibration panel are inserts 302. Each of the inserts 302 is selected to mimic a different type of defect within the proposed component. For example, one of the inserts 302 is formed of a composition that mimics an air gap. In alternative examples, the controller 107 is configured to control the 3D printer 102 to form an air gap within the calibration panel 110. In certain examples, the inserts 302 are formed of compositions that mimic other types of defects including, but not limited to, foreign materials within a composite, overlapping facesheets, and/or other acoustic anomalies.

Each insert 302 is formed of a different composition of digital materials. The composition is determined, as described above with reference to FIG. 2, by the mixture generator 205. Although the inserts 302 are depicted as uniformly distributed, it is to be understood that the inserts 302 can be positioned in a random manner, and/or stacked on top of each other.

Figure 4:
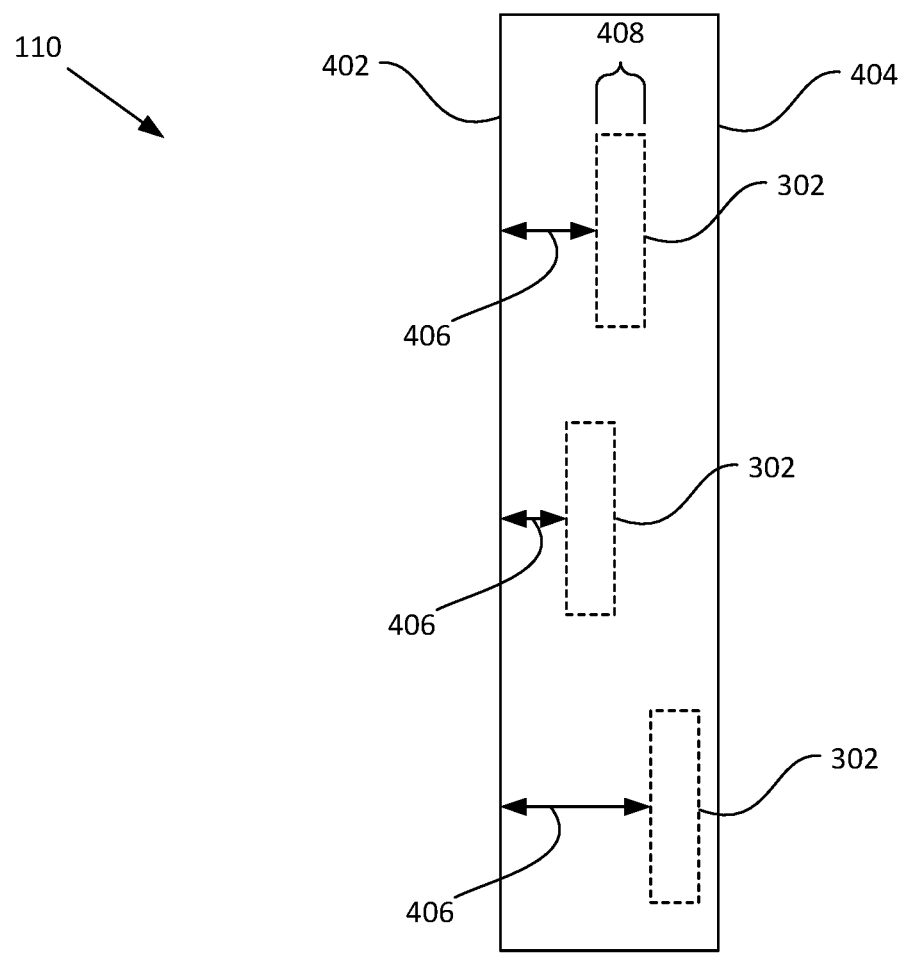
FIG. 4 is a schematic block diagram of a side of the calibration panel of FIG. 3, according to examples of the subject disclosure.

FIG. 4 is a schematic block diagram of a side of the calibration panel 110, according to examples of the subject disclosure. In the depicted embodiment, the calibration panel 110 has a thickness between a front surface 402 and a back surface 404. This thickness is selected to approximate a thickness of a proposed component design in some examples. The controller 107 is configured to embed inserts 302 at different distances (i.e., depth) 406 between the front surface 402 and the insert 302. This beneficially allows the component designer to test defects at different depths of the proposed component. For example, if the proposed component is formed of multiple layers of carbon fiber, the controller 107 is configured to adjust the distance 406 at which the insert 302 is embedded to mimic a defect between, for example, the third and fourth layers of the composite material. In addition examples, the inserts 302 are formed and embedded with different thicknesses 408. By varying the thickness of an insert 302, the insert 302 is adjusted to approximate the speed of sound in an actual defect. For example, if a digital material is not available to approximate a certain defect, a digital material with a similar but faster acoustic speed can be selected and embedded with an increased thickness. The increased thickness causes a longer amount of time for sound to pass through the defect, thereby approximating a defect with a slower speed of sound.

In certain embodiments, the calibration panel 110 is substantially rectangular, as depicted. Alternatively, the calibration panel 110 is formed in a shape that resembles the proposed component design. In some examples, the proposed component is a panel or other structural piece for use in the manufacture of a vehicle, especially airplanes. In certain examples, the proposed component is any component of a vehicle that benefits from NDE testing, or otherwise has a requirement to be NDE capable. If a calibration panels 110 fails NDE testing (i.e., the equipment fails to detect one of the inserts 302) this is indicative of a high probability that the proposed design will not be NDE capable.

Figure 5:
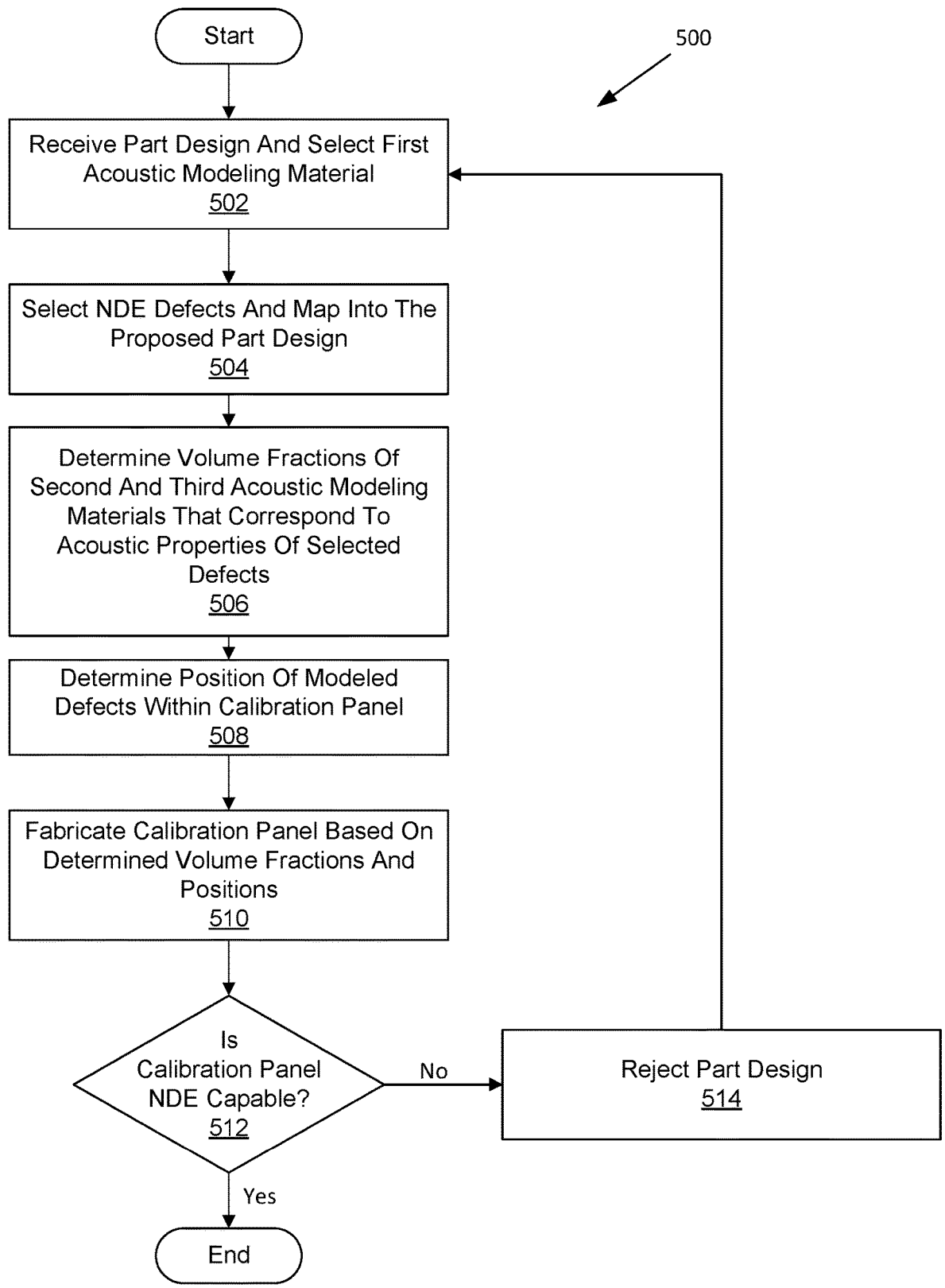
FIG. 5 is a schematic flowchart diagram illustrating a method of iterative component design, according to examples of the subject disclosure.

FIG. 5 is a schematic flowchart diagram illustrating a method 500 of iterative component design, according to examples of the subject disclosure. In certain examples, the method 500 includes receiving, at step 502, design data indicative of a proposed component design and selecting a first digital material that approximates an acoustic property of a composite material specified within the design data. In some examples, the design data is a digital representation of a proposed 3D component having information for each voxel that defines the 3D component. The method also includes, at step 504, selecting defects and mapping the defects into the proposed component design. In certain examples, mapping the defects into the proposed component design includes determining a position and a depth of an insert that models a selected defect.

At step 506, the method 500 determines the volume fraction of the acoustic modeling materials (e.g., digital materials) that correspond to the acoustic properties of the selected defects. The acoustic properties include, in certain examples, an acoustic velocity, or stated differently, the speed of sound through the defect. As described above with reference to FIG. 2, a second digital material is selected with an acoustic property value less than the acoustic property value of the defect, and a third digital material is selected with an acoustic property value greater than the acoustic property value of the defect. The volume fraction of the digital materials is determined by a formula in some examples.

At step 508, the method 500 determines a position of the modeled defects within the calibration panel 110. At step 510, the method 500 includes fabricating a calibration panel based on the determined volume fractions and positions, and embeds inserts 302 into the calibration panel 110.

At decision step 512, the method 500 determines if the fabricated calibration panel 110 is NDE capable. In other words, the method 500 determines if NDE testing equipment is able to detect the inserts 302 that mimic defects in the proposed component design. The method 500, in certain examples, indicates that the calibration panel has one of a "detectable status" or a "not-detectable status." If the determination is negative, the method 500 rejects the proposed component design at step 514 and the method 500 returns to step 502.

In the above description, certain terms can be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items can be used and only one of the items in the list can be needed. The item can be a particular object, thing, or category. In other words, "at least one of" means any combination of items or number of items can be used from the list, but not all of the items in the list can be required. For example, "at least one of item A, item B, and item C" can mean item A; item A and item B; item B; item A, item B, and item C; or item B and item C. In some cases, "at least one of item A, item B, and item C" can mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

To the extent that terms "includes," "including," "has," "contains," and variants thereof are used herein, such terms are intended to be inclusive in a manner similar to the term "comprises" as an open transition word without precluding any additional or other elements.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function can additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagrams, they are understood not to limit the scope of the corresponding method. Indeed, some arrows or other connectors can be used to indicate only the logical flow of the method. For instance, an arrow can indicate a waiting or monitoring period of unspecified duration between enumerated steps of the depicted method. Additionally, the order in which a particular method occurs can or can not strictly adhere to the order of the corresponding steps shown.

The disclosed subject matter can be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of manufacturing non-destructive evaluation (NDE)-compliant components, the method comprising:
   receiving design data indicative of a proposed design of a component;
   manufacturing a reference standard model of the component, where the reference standard model comprises:
   a body formed by additive manufacturing from a first digital material having an acoustic property selected to approximate an acoustic property of a composite material specified within the design data; and
   an insert embedded within the body, the insert formed of at least a second digital material having an acoustic property selected to approximate an acoustic property of a defect within the composite material;
   testing the reference standard model to determine if the insert is detectable using acoustic emission testing; and
   rejecting, in response to a not-detectable status of the insert, the proposed design of the component.

2. The method of claim 1, further comprising forming the insert from a composition of the second digital material and at least a third digital material.

3. The method of claim 2, where a volume fraction $f$ of the second digital material is based on a desired velocity of sound $C_d$, an elastic moduli $E_1$ of the second digital material, an elastic moduli $E_2$ of the third digital material, a density $\rho_1$ of the second digital material, a density $\rho_2$ of the third digital material, a Poisson ratio $v_1$ of the second digital material, and a Poisson ration $v_2$ of the third digital material, and further comprising determining the volume fraction $f$ according to an equation:

$$C_d = \sqrt{\frac{\int E_1 + (1-f)E_2}{\int \rho_1 + (1-f)\rho_2}\left[\frac{1-fv_1-(1-f)v_2}{(1-2(fv_1+(1-f)v_2))(1+3(fv_1+(1-f)v_2))}\right]}.$$

4. The method of claim 3, where the desired velocity of sound $C_d$, is equivalent to a velocity of sound through the defect, and further comprising selecting a digital material from a plurality of digital materials as the second digital material, where the second digital material has a velocity of sound through the second digital material less than the desired velocity of sound $C_d$.

5. The method of claim 1, wherein the design data comprises a digital representation of a proposed three-dimensional (3D) component.

6. The method of claim 5, wherein the design data comprises information for each one of a plurality of voxels that define the 3D component.

7. The method of claim 1, further comprising selecting at least one defect that would be prone to exist in a component manufactured according to the proposed design of the component.

8. The method of claim 7, further comprising mapping the at least one defect into the proposed design of the component.

9. The method of claim 8, wherein mapping the at least one defect into the proposed design of the component comprises determining at least one of a desired position or a desired depth of the at least one defect in the proposed design of the component.

10. The method of claim 9, wherein mapping the at least one defect into the proposed design of the component comprises determining both the desired position and the desired depth of the at least one defect in the proposed design of the component.

11. The method of claim 8, wherein the at least one defect is selected from a group consisting of an air gap, an overlay, and a foreign object.

12. The method of claim 7, wherein a plurality of defects are selected and the reference standard model comprise a plurality of inserts embedded within the body.

13. The method of claim 12, wherein:
   each one of the plurality of defects is a type of defect different than the type of defect of any other of the plurality of defects; and
   each one of the plurality of inserts is made of a second digital material that is different than the second digital material of any other of the plurality of inserts.

14. The method of claim 1, wherein the reference standard model is tested using acoustic emission testing equipment to determine if the insert is detectable using acoustic emission testing.

15. The method of claim 1, further comprising accepting, in response to a detectable status of the insert, the proposed design of the component.

16. The method of claim 1, further comprising, in response to rejecting the proposed design of the component:
   receiving design data indicative of a new proposed design of the component;
   manufacturing a reference standard model of the component according to the new proposed design;
   testing the reference standard model of the component according to the new proposed design; and
   rejecting, in response to a non-detectable status of the insert of the referenced standard model of the component according to the new proposed design, the new proposed design of the component, or accepting, in response to a detectable status of the insert of the referenced standard model of the component according to the new proposed design, the new proposed design of the component.

17. The method of claim 1, wherein the acoustic property of the composite material is the speed of sound through the composite material.

18. The method of claim 1, wherein the acoustic property of the defect is the speed of sound through the defect.

19. The method of claim 1, wherein the acoustic property of the composite material is one or more of reflection, frequency, noise, attenuation, or impedance.

20. The method of claim 1, wherein the acoustic property of the defect is one or more of reflection, frequency, noise, attenuation, or impedance.

\* \* \* \* \*